(12) United States Patent
Ekes

(10) Patent No.: US 6,251,005 B1
(45) Date of Patent: Jun. 26, 2001

(54) ANIMAL SKINNING RACK

(76) Inventor: Danny Ekes, P.O. Box 278, Neely, MS (US) 39461

( * ) Notice: Subject to any disclaimer, the term of this patent is extended or adjusted under 35 U.S.C. 154(b) by 0 days.

(21) Appl. No.: 09/434,397

(22) Filed: Nov. 5, 1999

Related U.S. Application Data

(60) Provisional application No. 60/107,529, filed on Nov. 9, 1998.

(51) Int. Cl.[7] ..................................................... A22B 1/00
(52) U.S. Cl. ........................... 452/185; 452/194; 452/197
(58) Field of Search .................................. 452/185, 194, 452/197, 125

(56) References Cited

U.S. PATENT DOCUMENTS

| | | | | |
|---|---|---|---|---|
| D. 386,918 | * | 12/1997 | Collins | D6/462 |
| 849,290 | * | 4/1907 | Vanderbilt | 452/194 |
| 2,846,942 | * | 8/1958 | Bowman | 452/194 |
| 5,569,071 | * | 10/1996 | Metier et al. | 452/185 |

FOREIGN PATENT DOCUMENTS

| | | | | |
|---|---|---|---|---|
| 246472 | * | 9/1947 | (CH) | 452/194 |
| 35930 | * | 3/1960 | (CH) | 452/194 |
| 157829 | * | 1/1905 | (DE) | 452/194 |
| 173582 | * | 7/1906 | (DE) | 452/185 |

* cited by examiner

Primary Examiner—Willis Little
(74) Attorney, Agent, or Firm—George L. Williamson

(57) ABSTRACT

The present invention discloses a device for holding the carcass of an animal in a selected position for removing skin from the carcass of the animal having a horizontal bench like platform supported by multiple legs. The animal which is to be skinned is placed on the horizontal platform with each of the four legs of the animal having attachment means to one each of four arms which are angularly attached to the horizontal bench. The animal's legs are attached to the arms by adjustable chains or the like and the carcass is held securely in position while it is skinned.

14 Claims, 3 Drawing Sheets

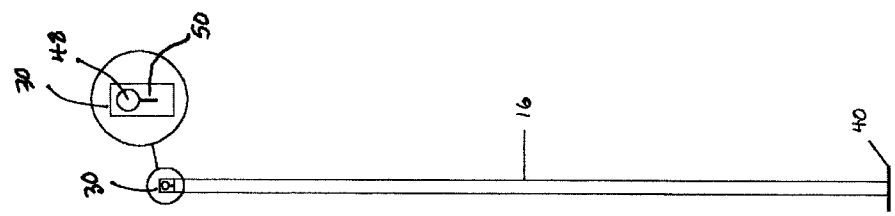
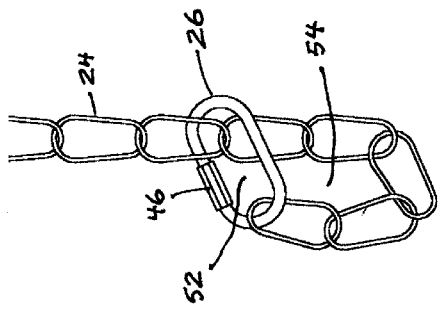
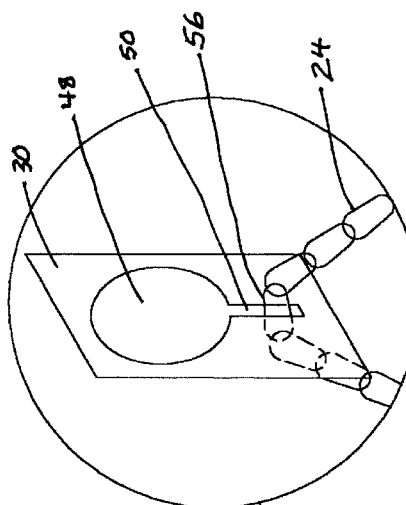
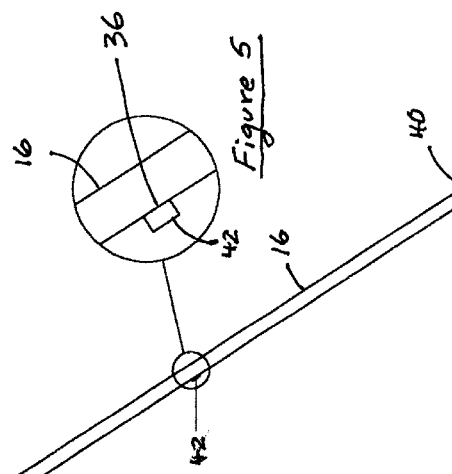
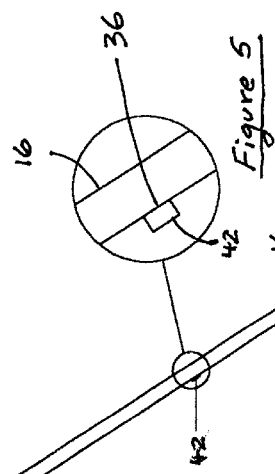
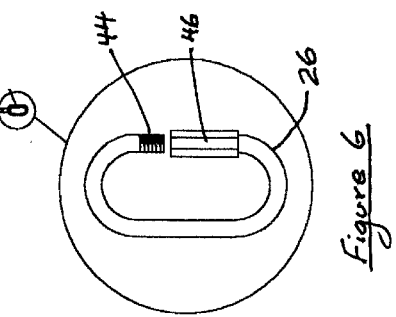

ANIMAL SKINNING RACK

This application is a continuation of Provisional Application Ser. No. 60/107,529 filed on Nov. 9, 1998 having the same title.

BACKGROUND OF THE INVENTION

1. Field of the Invention

The present invention relates generally to devices for removing skin from the carcass of an animal and, more particularly, relates to a device for skinning game which can be operated by one person.

2. Description of the Prior Art

Devices for skinning game have been described in the prior art; however, none of the prior art discloses the unique features of the present invention.

In U.S. Pat. No. 4,317,257, dated Mar. 2, 1982, Engel disclosed a device for attachment to the skin of a meat animal to be pulled by a power device and strip the skin from the animal carcass. In addition, the device can be used for carrying or dragging the animal and for hanging the carcass after skinning.

In U.S. Pat. No. 4,338,703, dated Jul. 13, 1982, Tanner disclosed an invention relating to a supporting device particularly for game animals, which comprises a first and second elongated member. A first end of the second elongated member is attached perpendicularly to a first end of the first member. A first, stationary cross bar is attached perpendicularly to a second end of the second member. In a preferred embodiment of the present invention the first elongated member is rotatably received within a sleeve. In a further preferred embodiment a second cross bar, movable toward and away from the first, stationary cross bar, is displaced by a cable and a winch. A pair of chains having ends of the stationary and second movable cross bar passed through appropriate links of each of the chains selectively holds the movable cross bar against downward vertical movement with respect to the stationary cross bar and limits pivotal and rotational movement of the movable cross bar about the cable. The supporting device of the present invention is adapted to be received in a slot typically provided in a side wall of a bed of a truck or attached to a screw arranged on any suitable support device. In a simplified embodiment of the present invention, the movable cross bar, the chains, the cable, and the winch are eliminated and the stationary cross bar is used to support an animal. In addition, a pair of braces is arranged to further stabilize the stationary cross bar.

In U.S. Pat. No. 5,482,501, dated Jan. 9, 1996, Frits disclosed an apparatus for removing the skin from an animal carcass. The apparatus comprises a cable, a two stage ball, and a skinner plate. The specially shaped two stage ball has a larger lobe and a relatively smaller lobe and a neck connecting the two lobes. To begin the skinning process, cuts are made in the deer's skin, or hide, and a portion of skin behind the deer's neck is pulled back. The skinner plate is placed on the raw side of the hide. The relatively smaller lobe of the two staged ball is pushed through an aperture in the skinner plate from the hair side of the hide. The cable is then tightened around the neck of the two stage ball, thereby cinching the hide to the two stage ball. A pulling force can then be applied on the cable and the skin peeled from the animal carcass.

In U.S. Pat. No. 5,643,073, dated Jul. 1, 1997, Tice described a skinning apparatus which is constructed of durable metal and consists of a flat back plate segment and a plate key insert containing a slot. On the back plate segment are a first aperture situated over a second aperture. The first aperture is a circular hole, and is intended to be affixed to a cable or chain attached to a truck or other vehicle. The second aperture is a key-shaped hole and forms the orifice through which the hide of the animal will be inserted. Once the skin of the game is pushed through the slot in the plate key insert, the skin is wrapped and folded about the plate key insert and inserted through the second aperture. The skin is then secured by locking the plate key insert within the second aperture.

In U.S. Pat. No. 5,336,129, dated Aug. 9, 1994, Frith, disclosed a device for removing the hide from a carcass of an animal comprising a base plate including a clamping hole disposed thereon, means for securing a cable thereto, a notch disposed thereon for guiding the cable away from the securement means, and means for securing the hide to an externally positioned and prepared animal carcass through the clamping hole of the base plate, so that when the cable is pulled, the hide is torn away from the carcass.

In U.S. Pat. No. 4,543,688, dated Oct. 1, 1985, Barchus disclosed an animal skinning holder including a bracket adopted for securement to a supporting surface, a base plate incorporating wedge connecting device may removably support the bracket to the supporting surface. A pair of arms extend forwardly from the bracket, incorporating clamps at their forwardmost ends, and cooperate with ratchet jaws that are designed for binding, in a wedging fashion, if any animal leg inserted within the clamp in preparation for its skinning.

In U.S. Pat. No. 5,211,601, dated May 18, 1993, Cope disclosed a mechanical device for removing the skin from white-tail deer or other game animals of similar size. This invention is self-supporting and needs no assistance from tree limbs or other permanent overhead structures as conventional methods. With the skin holders the skin is held stationary while the carcass is lifted and pulled from the skin. The carcass is pulled from the skin by mechanical means as compared to the skin being pulled from the carcass by hand with the present method.

In U.S. Pat. No. 5,336,124, dated Aug. 9, 1994, Garside disclosed a method and apparatus for skinning while protecting the hide and carcass of game animals while the game animal may be held in a horizontal position at ground level. The apparatus includes a head harness for connection of the head of the game animal to a stationary object. Also included is a skin remover which is attachable to the skin of the animal just below a neck incision and is also attachable to a vehicle bumper. A wrap-around game bag locatable beneath the game during the skinning process ensures that dirt and debris are kept away from the game during the skinning process. The method of skinning includes attaching the head of the game to a stationary object, attaching the skin remover to a vehicle and then applying force with the vehicle to the skin of the animal while the animal remains attached to the stationary object. Just before the skinning occurs and when tension is maximized, the bag is located in its open orientation beneath the game animal. Once the skin is removed the head harness is removed from the head of the animal and the wrap-around game bag is closed around the thus skinned game animal.

While these devices for skinning game may be suitable for the purposes for which they were designed, they would not be as suitable for the purposes of the present invention as hereinafter described.

SUMMARY OF THE PRESENT INVENTION

The present invention discloses a device for holding the carcass of an animal in a selected position for removing skin from the carcass of the animal having a horizontal tray or bench-like platform supported by multiple legs. The animal which is to be skinned is placed on the horizontal platform with each of the four legs of the animal having attachment means to one each of four arms which are angularly attached to the horizontal bench extending generally upwardly from the bench. The animal's legs are attached to the arms by adjustable chains or the like and the carcass is held securely in position while it is skinned.

An objective of the present invention is to provide a simple means of skinning an animal. Furthermore, an object is to provide a means for skinning an animal which can be operated by one person.

A further objective of the present invention is to provide means which will allow an animal to be held tightly in place while it is being skinned.

A further object of the present invention is to provide a skinning rack which is safe and efficient to operate by one person.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. The invention is best described by the appended claims.

BRIEF DESCRIPTION OF THE DRAWINGS

In order that the invention may be more fully understood, it will now be described, by way of example, with reference to the accompanying drawings in which:

FIG. 4 is an elevation view of the end of the leg member of the present invention.

FIG. 5 is an enlarged view of a portion of the leg member of the present invention.

FIG. 6 is an enlarged view of a C-link of the present invention.

FIG. 7 is an elevation side view and enlarged view of a portion of a leg member of the present invention.

FIG. 8 is a perspective view of the chain and C-link of the present invention.

FIG. 9 is a perspective view of the chain and attachment means of the present invention.

DESCRIPTION OF THE PREFERRED EMBODIMENT(S)

Figure 1:
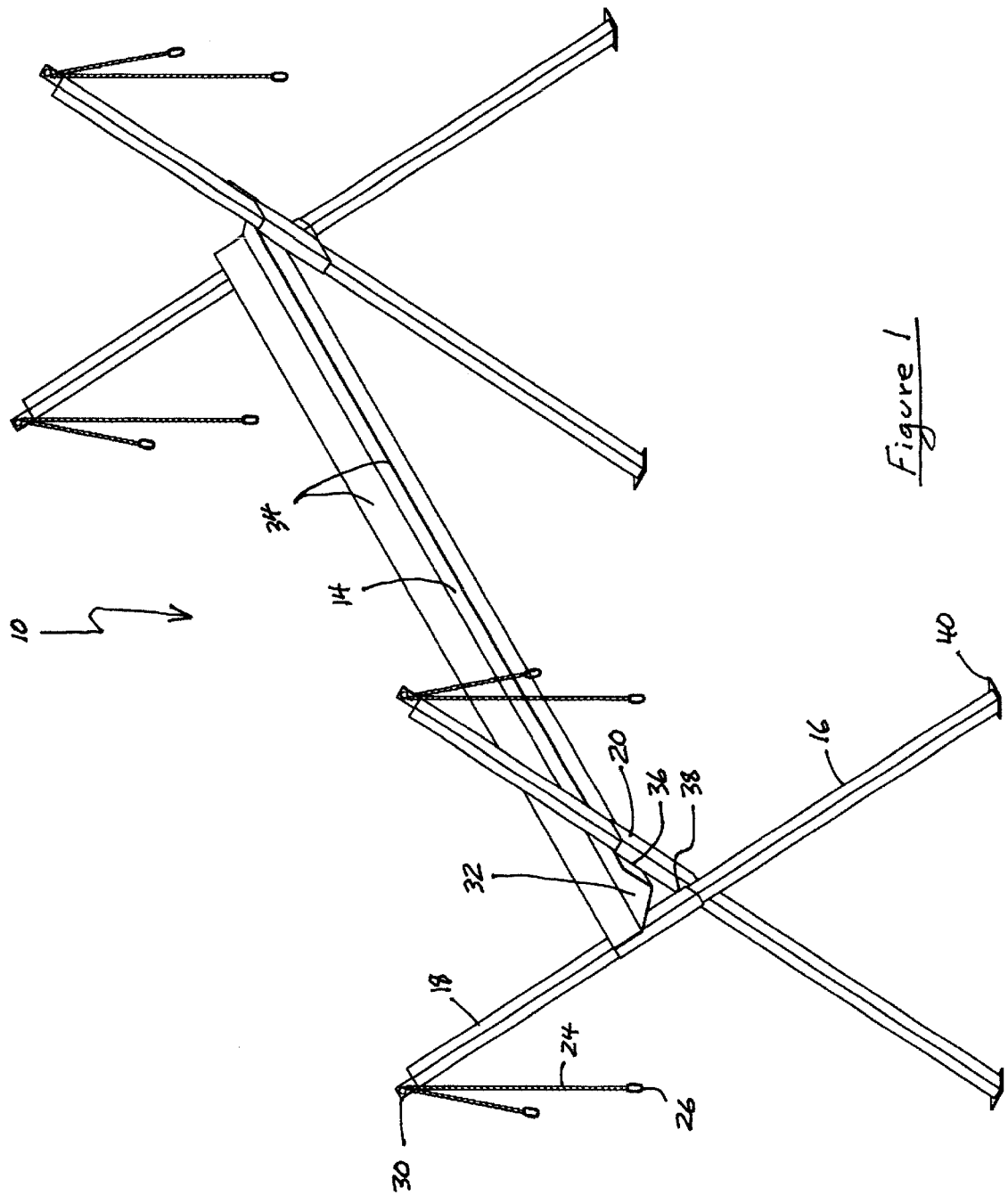
FIG. 1 is a perspective view of the present invention.

Turning now descriptively to the drawings, in which similar reference characters denote similar elements throughout the several views, FIGS. 1 through 9 illustrate the present invention being a device for skinning animals.

Turning to FIG. 1, therein is shown a perspective view of the present invention generally shown at 10 useful for receiving an animal which is placed stomach up upon the present invention whereby the animal can be skinned. Shown therein is the flat, generally horizontal tray rectangular shaped bench like platform or rack 14 which forms the base of the present invention which is supported by multiple legs 16 being four in number. Also shown therein are the multiple, four arms 18 which extend angularly upwardly away from the tray 14. Arms and legs 18, 16 are expected to be about one inch square steel tubing or the like and the tray 14 is about ¼ inch thick steel plate or the like. The legs and arms 16, 18 form an angle of about 45 degrees to the horizontal in a plane perpendicular to the center line of the rack 14. Furthermore, shown are attachment means 20 for attaching the legs and arms 16, 18 to the bench 14. Also shown therein are connecting means 24 being chains, cables or like means which are expected to be about three feet long for attaching the animal to the arms of the present invention. Also shown are fastening means 26 for connecting the chains 24 to the animal and connecting means 30 for connecting the chains 24 to the arms 18. Approximate dimensions of the present invention are its bench length about 5 feet, its trough 32 width about 3 to 4 inches which is the trough 32 having upwardly lateral edges 34 of about three inches in length on the upper surface of the rack 14 running lengthwise down the rack wherein the deer's back will lie and the legs 16 which are approximately two and one-half feet high. Leg fastening means 20 are expected to be about one and one-quarter inch, hollow square steel tubing into which leg members 16 are inserted. Leg fastening means 20 are connected to tray 14 by welding or like at 36 and are connected to each other by welding or like at 38. Also shown are steel plates 40 disposed on the bottom ends of legs 16 which are expected to be one-quarter inch thick steel plate or the like. Note that leg members 16, 18 are inserted and passed through the fastening means 20 as will be hereinafter discussed.

Figure 2:
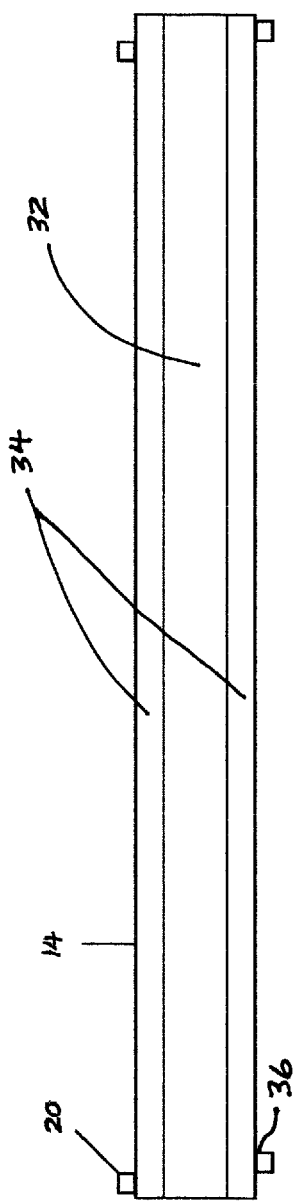
FIG. 2 is a plan view of the tray of the present invention.

Turning to FIG. 2, therein is shown a plan view of the tray 14 of the present invention. Also shown is the trough 32 along with its edges 34 having attached thereto leg fastening means 20 as previously disclosed. Note that leg fastening means 20 are attached to tray 14 by welds 36 or like fastening means.

Figure 3:
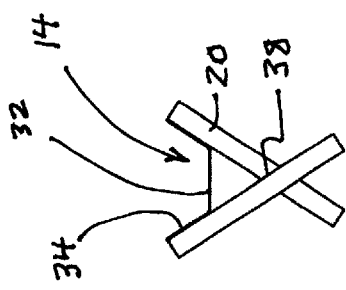
FIG. 3 is an elevation view of the end of the tray of the present invention.

Turning to FIG. 3, therein is shown an elevation view of the end of the tray 14 showing the trough 32 along with its edges 34 and the leg fastening means 20. Note that the means 20 are fastened together by welds 38 or the like.

Turning to FIG. 4, therein is shown an elevation view of the leg and arm member 16, 18 being a single piece of unitary construction of the present invention along with the chain connecting means 30, chain 24, and C-link 26. Also shown on leg member 16 is the stop 42 shown on the outer perimeter of the leg 16 which stops the leg at the lower edge or rim of fastening means 20 when the legs are inserted through the fastening means 20 from the bottom of fastening means 20. Note that stop 42 is positioned on the lower rim of fastening means 20 which supports or maintains the present invention in an upstanding position.

Turning to FIG. 5, therein is shown an enlarged view of stop 42 which is attached by welding 36 or like means to leg 16 and functions as hereinabove disclosed.

Turning to FIG. 6, therein is shown an enlarged view of C-link 26 or the like, e.g., a safety clip, having a threaded end 44 and an internally threaded collar 46 for mating with the threaded end 44 being 46 which is used for opening and closing C-link 26.

Turning to FIG. 7, therein is shown an elevation of the side view of leg 16 showing the bottom base member plate 40 along with the chain fastening means 30 having a large aperture 48 therein and an upwardly standing slot 50 therein.

Turning to FIG. 8, therein is shown a perspective view of chain 24 showing the way in which the C-link 26 and chain cooperate to form a tie around the leg of the animal to be skinned. As can be seen in FIG. 8, the chain is passed back through the inner aperture 52 of C-link 26 by opening the link using collar 46 and thereby passing the link 26 around the chain 24 thereby forming a looped aperture 54 through which the leg of the animal to be skinned is passed. The chain can then be tightened around the leg of the animal by sliding link 26 down the chain toward loop aperture 54 in order to decrease the size of the aperture 54 until it tightly engages the outer circumference of the leg of the animal to be skinned. The chain 24 is then tightened through chain connecting means 30 by placing a chain link through slot 50 as will be hereinafter described.

Turning to FIG. 9, therein is shown a perspective view of the chain connecting means 30 in operative connection with chain 24. The chain connecting means 30 has an aperture 48 therein through which the chain 24 passes along with the upright standing slot 50 which communicates with aperture 48. Chain 24 is fixedly connected to connecting means 30 by positioning a single chain link 56 in slot 50 in the conventional manner whereby chain 24 is fixedly connected to connecting means 30.

In operation, the animal is first gutted and then placed belly up on the tray 14 and its legs attached to the arms 18 and thereby held in place to be skinned by hand in the conventional manner. The legs of the carcass are held on the rack in a spaced apart relationship for skinning.

LIST OF REFERENCE NUMERALS

With regard to the reference numerals used, the following numbering is used throughout the drawings.
10 present invention
14 rack bench
16 legs
18 arms
20 leg fastening means
24 chain
26 chain fastening means/C-link
30 chain connecting means
32 trough
34 trough edges
36 welds
38 welds
40 leg ends
42 stop
44 threaded end
46 collar
48 aperture
50 slot
52 C-link aperture
54 chain loop aperture
56 chain link

I claim:
1. An apparatus useful for removing the skin from the carcass of an animal:
   a) an elongated generally horizontal tray member;
   b) a plurality of legs attached to said tray member;
   c) a plurality of generally upwardly extending arms attached to said tray member;
   d) means for attaching said legs and said arms to said tray member;
   e) a plurality of flexible members for connection to the legs of the carcass;
   f) means for connecting said plurality of flexible members to said arms of said tray member, whereby the carcass is connected to the apparatus; and;
   g) said means for connecting further comprises a plate having an aperture therein and a slot therein, said plate disposed on the upper end of said arm.

2. The apparatus of claim 1, said tray member further comprising a central trough having a pair of upwardly extending edges thereon, said trough for receiving the back of the animal.

3. The apparatus of claim 1, wherein each of said legs and said arms are of unitary construction.

4. The apparatus of claim 3, said legs and said arms further comprising tubing.

5. The apparatus of claim 4, said tubing further comprising plates attached to the lower ends of said legs.

6. The apparatus of claim 2, said means for attaching said legs and said arms to said tray member further comprising a plurality of hollow tubing having means for fixed attachment on said edges of said tray member.

7. The apparatus of claim 6, said means for fixed attachment further comprising welding.

8. The apparatus of claim 7, said hollow tubing further comprises means for fixed attachment to each other.

9. The apparatus of claim 8, said means for fixed attachment to each other further comprising welding.

10. The apparatus of claim 1, said flexible member further comprising a chain.

11. The apparatus of claim 10, said chain further comprising a C-link on each end.

12. The apparatus of claim 11, further comprising a loop fonned in said chain, said loop for receiving the leg of the animal, said loop formed by said chain passing through said C-link, said chain passing through said slot in said plate.

13. The apparatus of claim 1, wherein the number of said legs and said arms are four.

14. The apparatus of claim 1, wherein said legs and said arms form an angle of about 45 degrees to the horizontal in a plane perpendicular with the centerline of said tray.

* * * * *